US012420620B2

(12) United States Patent
Cho et al.

(10) Patent No.: US 12,420,620 B2
(45) Date of Patent: Sep. 23, 2025

(54) INNER BELT MOUNTING STRUCTURE OF DOOR FOR VEHICLE (71) Applicants: Hyundai Motor Company, Seoul (KR); Kia Corporation, Seoul (KR)

(72) Inventors: Sung-Yong Cho, Seoul (KR); Beom-Seok Kang, Ansan-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/491,316

(22) Filed: Oct. 20, 2023

(65) Prior Publication Data

US 2024/0190225 A1   Jun. 13, 2024

(30) Foreign Application Priority Data

Dec. 9, 2022   (KR) .................. 10-2022-0171622

(51) Int. Cl.
*B60J 10/75* (2016.01)
*B60J 5/04* (2006.01)
*B60J 10/15* (2016.01)

(52) U.S. Cl.
CPC ............. *B60J 10/75* (2016.02); *B60J 5/0411* (2013.01); *B60J 10/15* (2016.02)

(58) Field of Classification Search
CPC ........................................................ B60J 10/75
See application file for complete search history.

(56) References Cited

U.S. PATENT DOCUMENTS

| | | | |
|---|---|---|---|
| 6,176,003 B1* | 1/2001 | Aoyama | B60J 10/75 264/171.15 |
| 6,401,394 B2* | 6/2002 | Nozaki | B60J 10/74 49/377 |
| 6,660,360 B2* | 12/2003 | Mertzel | B32B 25/08 49/490.1 |
| 7,735,264 B2* | 6/2010 | Rieder | B60J 10/75 296/146.16 |
| 8,740,276 B2* | 6/2014 | Takeyoshi | B60R 13/04 52/716.5 |
| 9,067,547 B2* | 6/2015 | Jun | B60R 13/04 |
| 9,211,781 B2* | 12/2015 | Saiki | B60R 13/04 |
| 9,248,729 B2* | 2/2016 | Yi | B60J 5/0411 |
| 10,023,030 B2* | 7/2018 | Shimoda | B60J 5/0413 |
| 10,035,411 B2* | 7/2018 | Toyota | B60J 10/50 |
| 10,145,401 B2* | 12/2018 | Snoeyink | F16B 5/065 |
| 10,220,691 B2* | 3/2019 | Masumoto | B60J 10/233 |
| 10,232,694 B2* | 3/2019 | Alhof | B60J 10/88 |
| 10,239,399 B2* | 3/2019 | Masumoto | B60J 10/76 |
| 10,421,417 B2* | 9/2019 | Itoh | B60J 10/22 |
| 10,434,857 B2* | 10/2019 | Walawender | B60J 10/76 |
| 10,889,171 B2* | 1/2021 | Thiele | B60J 10/32 |

(Continued)

FOREIGN PATENT DOCUMENTS

KR   100812450 B1   3/2008

*Primary Examiner* — Catherine A Kelly
(74) *Attorney, Agent, or Firm* — Slater Matsil, LLP (57) ABSTRACT

An embodiment inner belt mounting structure of a door for a vehicle includes an inner panel disposed inside the door of the vehicle, the inner panel including an installation groove, and an inner belt inserted into an upper end of the inner panel, wherein a first side of the inner belt is inserted in the installation groove, and wherein an inner belt joint of the inner belt is in contact with a frame of the door.

18 Claims, 7 Drawing Sheets

(56) References Cited

U.S. PATENT DOCUMENTS

| | | | |
|---|---|---|---|
| 11,186,153 B2 * | 11/2021 | Hasnaoui | B60J 10/33 |
| 11,964,546 B2 * | 4/2024 | Jin | B60J 5/0411 |
| 12,103,367 B2 * | 10/2024 | Peter | B60J 10/40 |

* cited by examiner

INNER BELT MOUNTING STRUCTURE OF DOOR FOR VEHICLE

CROSS-REFERENCE TO RELATED APPLICATIONS

This application claims the benefit of Korean Patent Application No. 10-2022-0171622, filed on Dec. 9, 2022, which application is hereby incorporated herein by reference.

TECHNICAL FIELD

Exemplary embodiments of the present disclosure relate to an inner belt mounting structure of a door for a vehicle.

BACKGROUND

In a door of a vehicle, an inner belt is applied to prevent an external noise and a noise due to a flow of air flowing into an interior of the vehicle from an inner space of the door between an inner panel and an outer panel.

Figure 1:
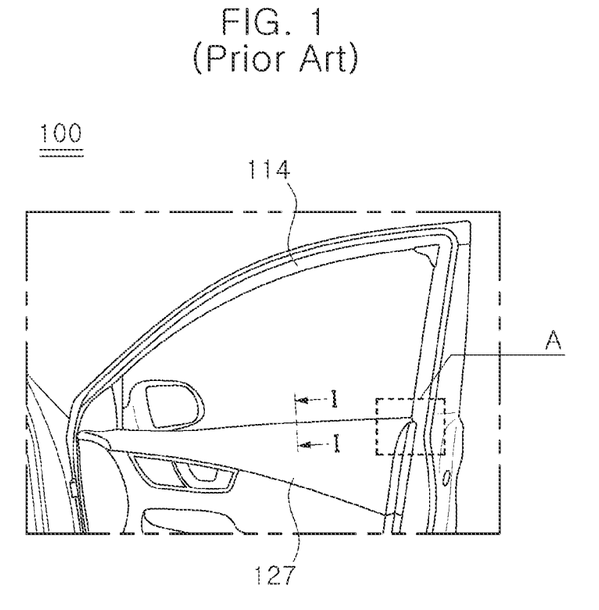
FIG. 1 is a perspective view illustrating a structure of a typical door of a vehicle.
Figure 2:
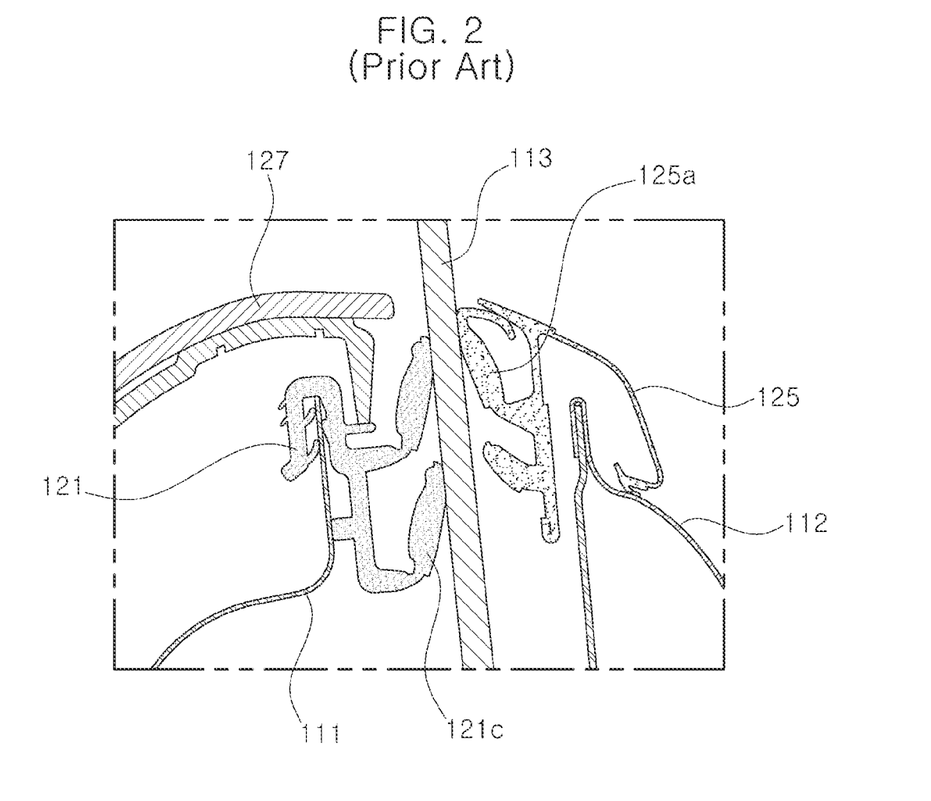
FIG. 2 is a cross-sectional view taken along line I-I of FIG. 1.

Looking at an upper structure of the door 100 of the vehicle, as shown in FIG. 1 and FIG. 2, upper ends of an inner panel 111 and an outer panel 112 are inserted into and coupled to an inner belt 121 and an outer belt 125, respectively, and a door glass 113 is moved up and down through a gap between the inner belt 121 and the outer belt 125. The inner belt 121 is provided to be in contact with an upper end of a door trim 127.

The inner belt 121 and the outer belt 125 have a structure in close contact with the door glass 113 through sealing lips 121c and 125a. In this way, a space between the inner belt 121 and the outer belt 125 is airtight to prevent a noise due to an air flow. Accordingly, an external noise or a noise introduced into the interior of the vehicle from the outside of the door is prevented.

Figure 3:
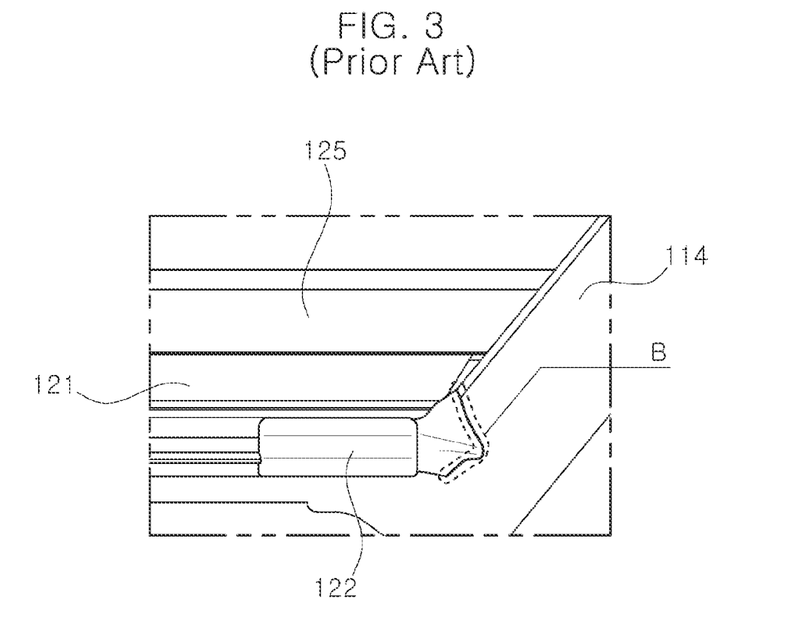
FIG. 3 is an enlarged view of portion A of FIG. 1.

As shown in FIG. 3, when the inner belt 121 is assembled to the inner panel 111, an inner belt joint 122 formed at an end portion of the inner panel 111 should be in close contact with the frame 114 of the door to achieve airtightness. However, due to an assembly dispersion, an assembly failure, and the like, a gap is generated between the inner belt joint 122 and a frame 114 (a region indicated by B in FIG. 3), and there is a problem in that a noise due to an air flow or an external noise is introduced through the gap. Since a structure is formed such that the inner belt 121 is inserted into an upper end of the inner panel 111, it is difficult to assemble the inner belt 121 at a predetermined position thus an assembly defect that causes the gap occurs.

As a noise due to an air flow or an external noise is introduced through the gap, quietness in an interior of the vehicle is degraded.

In particular, as the spread of electric vehicles to which internal combustion engines are not applied has recently expanded, a noise introduced through the gap between the inner belt joint 122 and the door frame 114 is relatively loud.

SUMMARY

Exemplary embodiments of the present disclosure relate to an inner belt mounting structure of a door for a vehicle. Particular embodiments relate to an inner belt mounting structure of a door for a vehicle, in which the inner belt of the door mounted on a door trim of the vehicle is mounted on the door of the vehicle. Other embodiments relate to an inner belt mounting structure of a door for a vehicle that prevents a gap from being generated between an inner belt and a door of a body in white (BIW) vehicle to achieve uniform sealing performance.

An embodiment of the present disclosure provides an inner belt mounting structure of a door for a vehicle that allows a position of an inner belt to be easily recognized at an inner panel when assembled, allows the inner belt to be mounted at a uniform position, and maintains an assembly position of the inner belt after assembly.

Other objects and advantages of embodiments of the present disclosure can be understood by the following description and become apparent with reference to the described embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided an inner belt mounting structure of a door for a vehicle that includes an inner panel provided inside a door of a vehicle and an inner belt which is fitted into an upper end of the inner panel and in which an inner belt joint is formed to be in contact with a frame of the door, wherein an installation groove into which one side of the inner belt is inserted is formed in the inner panel.

The inner belt may include a stopper formed to protrude from a surface of the inner belt toward the inner panel, and the stopper may be inserted into the installation groove.

The stopper may be formed at a position spaced apart from the inner belt joint in a direction opposite to a center pillar of the vehicle.

One side surface of the installation groove may become an inclined portion in which a width of the installation groove becomes narrower toward a lower portion of the installation groove.

The inclined portion may be formed at a side adjacent to the inner belt joint in the installation groove.

The other side surface of the installation groove may become a support for supporting the stopper and is in contact with the stopper to prevent the inner belt from being pushed.

A rear lip mat be formed in the inner belt to protrude from the surface of the inner belt in a length direction of the inner belt and to be in contact with an inner surface of the inner panel.

The rear lip may be positioned in a lower portion of the stopper.

The rear lip may be formed to be in contact with a bottom surface of the stopper.

The stopper and the inner belt joint may each be made of thermoplastic vulcanizates (TPV).

The stopper may be made of a material having hardness that is greater than that of the inner belt joint.

The inner belt may be manufactured by extrusion, and then the inner belt joint and the stopper may be molded by injection.

A surface in contact with the frame in the inner belt joint may be formed to be inclined.

DETAILED DESCRIPTION OF ILLUSTRATIVE EMBODIMENTS

Hereinafter, an inner belt mounting structure of a door for a vehicle according to embodiments of the present disclosure will be described in detail with reference to the accompanying drawings.

The inner belt mounting structure of a door for a vehicle according to embodiments of the present disclosure includes an inner panel 11 provided inside a door of a vehicle and an inner belt 21 which is fitted into an upper end of the inner panel 11 and in which an inner belt joint 22 is formed to be in contact with a frame 14 of the door. An installation groove 11a into which one side of the inner belt 21 is inserted is formed in the inner panel 11.

Figure 4:
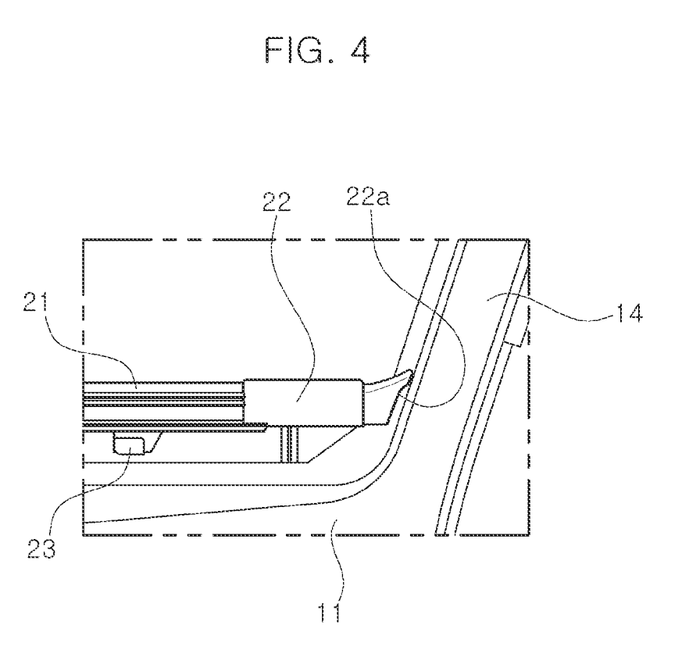
FIG. 4 is a perspective view illustrating a state in which an inner belt is mounted on an inner panel according to an inner belt mounting structure of a door for a vehicle according to embodiments of the present disclosure.
Figure 5:
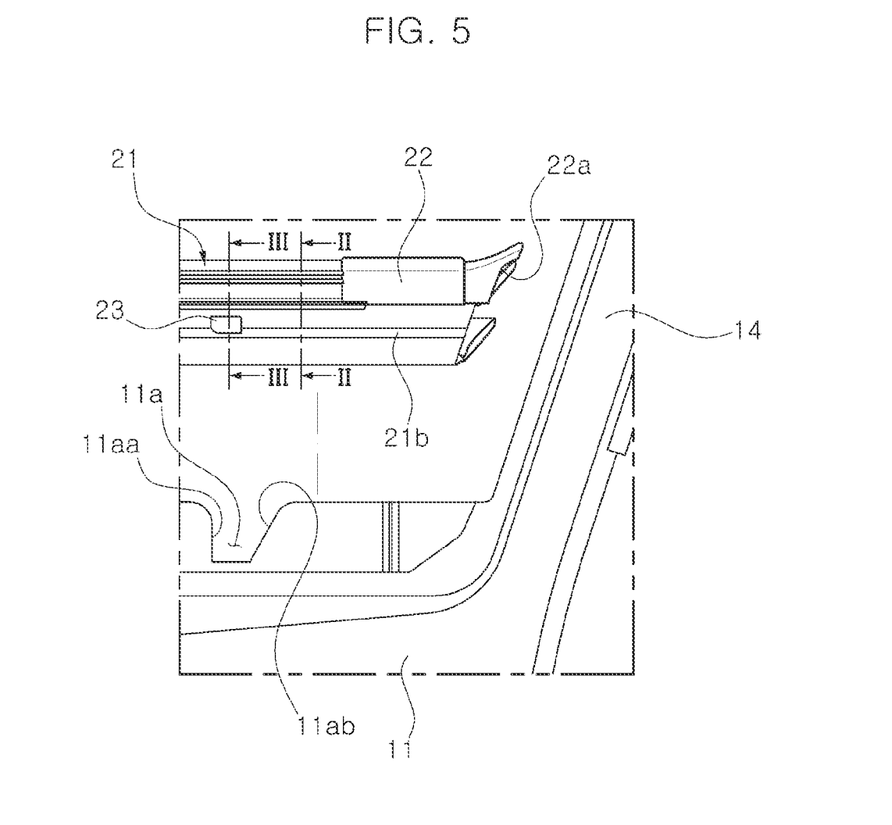
FIG. 5 is an exploded perspective view illustrating a state before the inner belt is mounted on the inner panel.
Figure 6:
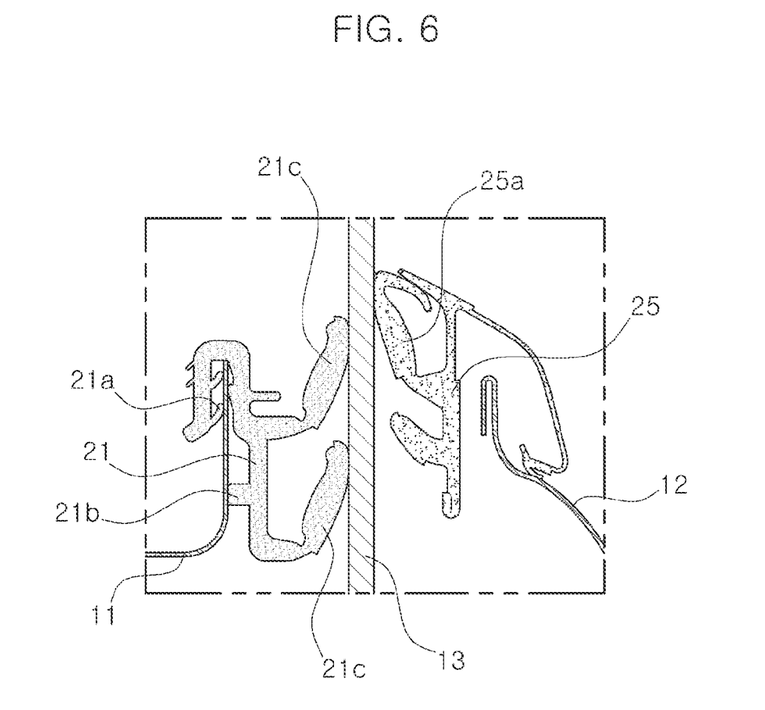
FIG. 6 is a cross-sectional view taken along line II-II of FIG. 5.
Figure 7:
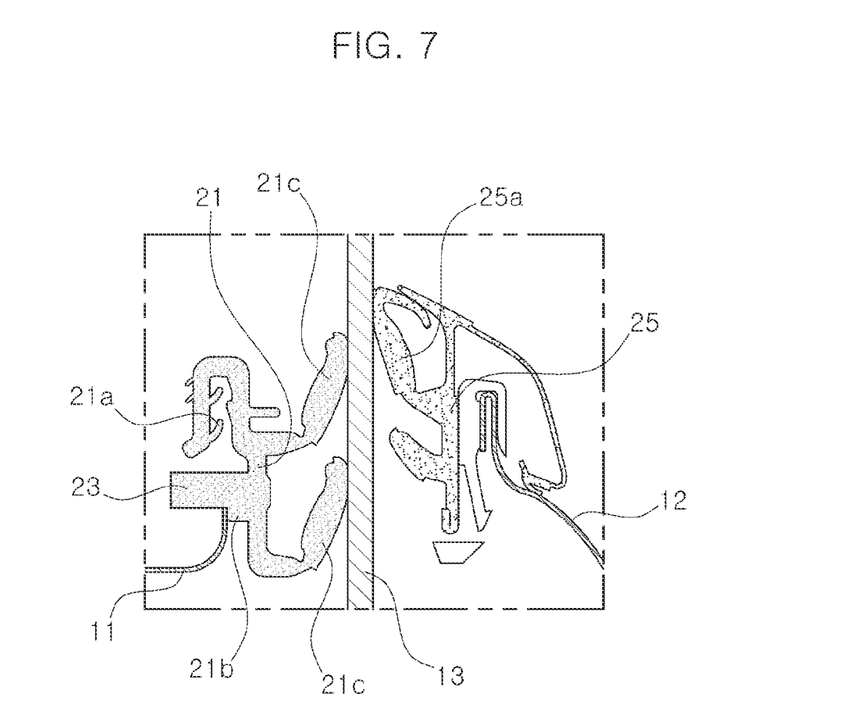
FIG. 7 is a cross-sectional view taken along line III-III of FIG. 5.

FIG. 4 shows a state in which the inner belt 21 is mounted on the inner panel 11 of the door according to embodiments of the present disclosure, FIG. 5 shows a state before the inner belt 21 is mounted on the inner panel 11, and FIGS. 6 and 7 show a cross-section of an upper portion of the door.

The inner panel 11 and the outer panel 12 constitute the door, and an inner belt 21 and an outer belt 25 are inserted into upper ends of the inner panel 11 and the outer panel 12, respectively. A door glass 13 is installed to be movable up and down between the inner panel 11 and the outer panel 12. The inner belt 21 and the outer belt 25 are provided with sealing lips 21c and 25a which are in close contact with the door glass 13 to achieve sealing.

Since the inner belt 21 is manufactured through extrusion, the inner belt 21 is formed to have the same cross-sectional shape in a length direction of the inner belt 21.

The inner belt 21 includes a fixing portion 21a fitted into and fixed to the upper end of the inner panel 11, a rear lip 21b protruding from the inner belt 21 to be in contact with an inner surface of the inner panel 11, and a sealing lip 21c in close contact with the door glass 13 to achieve airtightness.

The fixing portion 21a is formed in the form of gripping the upper end of the inner panel 11 and is fitted into and fixed to the upper end thereof.

The rear lip 21b is formed in the inner belt 21 to protrude from a surface of the inner belt 21 in a length direction of the inner belt 21 to be in contact with the inner surface of the inner panel 11. The rear lip 21b is in contact with the inner surface of the inner panel 11 to achieve airtightness between the inner belt 21 and the inner panel 11 so that a noise is blocked from being introduced between the inner belt 21 and the inner panel 11.

The sealing lip 21c is in contact with the door glass 13 to prevent moisture from being introduced through the door glass 13.

The inner belt joint 22 in contact with the frame 14 of the door is formed at one side of the inner belt 21. The inner belt joint 22 is made of thermoplastic vulcanizates (TPV) and is in close contact with the frame 14 to achieve airtightness between the inner belt joint 22 and the frame 14.

In particular, a surface of the inner belt joint 22 in contact with the frame 14 is formed as an inclined surface 22a so that, when the inner belt joint 22 is mounted in the frame 14, the inner belt joint 22 is in completely close contact with the frame 14.

In order to allow a mounting position of the inner belt 21 to be easily recognized in the inner panel 11 and prevent the inner belt 21 from being separated from the mounting position, an installation groove 11a inserted into one side of the inner belt 21 is formed in the inner panel 11. In addition, the installation groove 11a into which a stopper 23 is inserted is formed in the inner belt 21. As the stopper 23 is inserted into the installation groove 11a, the inner belt 21 is prevented from being separated from the mounting position.

The stopper 23 is formed in the form of protruding from the surface of the inner belt 21 toward the inner panel 11.

The stopper 23 may be integrally formed with the inner belt joint 22, and preferably, the stopper 23 may be formed separately at a position spaced apart from the inner belt joint 22. That is, the stopper 23 is formed at a position spaced apart from the inner belt joint 22 in a direction opposite to a center pillar of the vehicle. For example, in a front door of the vehicle, the stopper 23 is formed at a front side of the vehicle to be closer to the front pillar than the inner belt joint 22. Conversely, in a rear door of the vehicle, the stopper 23 is formed at a rear side of the vehicle to be closer to a rear pillar than the inner belt joint 22.

The installation groove 11a is formed to allow an operator to easily recognize a position where the inner belt 21 is mounted when the inner belt 21 is mounted and to support the stopper 23 after the stopper 23 is inserted into the installation groove 11a. Accordingly, the installation groove 11a is formed in a trapezoidal shape in which a width thereof becomes narrower toward a lower portion.

Accordingly, one side surface of the installation groove 11a becomes an inclined portion 11ab in which the width of the installation groove 11a becomes narrower toward the lower portion of the installation groove 11a, and the other side surface of the installation groove 11a becomes a support 11aa which comes into contact with the stopper 23 to prevent the inner belt 21 from being pushed and to support the stopper 23.

Due to the inclined portion 11ab, when the inner belt 21 is assembled to the inner panel 11, the stopper 23 is easily inserted and guided to be assembled at a predetermined position.

The inclined portion 11ab is formed at a side adjacent to the inner belt joint 22 in the installation groove 11a.

The support 11aa is in contact with and supports the stopper 23 to allow the inner belt 21 to be assembled at the predetermined position and to prevent the inner belt 21 from being separated from the mounted position after assembly.

The support 11aa is formed at a side opposite to the inclined portion 11ab in the installation groove 11a.

To describe a positional relationship between the stopper 23 and the rear lip 21b, the rear lip 21b is formed to be positioned in a lower portion of the stopper 23. In particular, the rear lip 21b is formed to be in contact with a bottom surface of the stopper 23 to prevent a noise from being introduced through a gap between the installation groove 11a and the stopper 23.

In the inner belt 21, the stopper 23 and the inner belt joint 22 may each be made of TPV. The TPV is an elastomer capable of exhibiting an advantage of thermoplastic rubber. By applying the TPV to the inner belt joint 22, the inner belt joint 22 is in close contact with the frame 14 to achieve airtightness. In addition, since the stopper 23 is supported on the support 11aa to exhibit an effect of supporting the inner belt joint 22 to be in close contact with the frame 14, the airtightness between the inner belt joint 22 and the frame 14 is increased.

The stopper 23 is made of a material having a hardness that is greater than that of the inner belt joint 22.

Meanwhile, in the inner belt 21 and the outer belt 25, the sealing lips 21c and 25a are each made of the TPV.

The inner belt 21 is manufactured by extrusion using polypropylene (PP) as a material, and then the stopper 23 and the inner belt joint 22 are formed by injection molding, and thus the inner belt joint 22 and the stopper 23 are integrally manufactured on one side of the inner belt 21.

In accordance with an inner belt mounting structure of a door for a vehicle according to embodiments of the present invention, when an inner belt is mounted in an inner panel, the inner belt is assembled at a predetermined position of the inner panel so that an assembly dispersion or an assembly failure can be prevented.

Since the inner belt is assembled to the inner panel with uniform assembly quality, an inner belt joint can be in close contact with a frame of the door so that a gap can be prevented from being generated between the inner belt joint and the frame of the door.

Accordingly, noise, vibration, harshness (NVH) performance of the vehicle, in particular, performance related to a noise, can be improved. That is, since a noise introduced into an interior through the inner belt of the door can be blocked, interior quietness can be improved.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A structure comprising:
an inner panel disposed inside a door, the inner panel comprising an installation groove; and
an inner belt arranged on an upper end of the inner panel,
wherein a first side of the inner belt is arranged in the installation groove,
wherein an inner belt joint of the inner belt is in contact with a frame of the door,
wherein the inner belt comprises a rear lip protruding from a surface of the inner belt in a length direction of the inner belt and in contact with an inner surface of the inner panel,
wherein the inner belt comprises a fixing portion fitted onto and fixed to the upper end of the inner panel and in contact with an outer surface of the inner panel,
wherein a lower end of the fixing portion is located higher than the rear lip,
wherein the lower end of the fixing portion is spaced apart from the inner panel, and
wherein the upper end of the inner panel is a single layer.

2. The structure of claim 1, wherein a surface of the inner belt joint in contact with the frame is an inclined surface.

3. The structure of claim 1, wherein a first side surface of the installation groove becomes an inclined portion in which a width of the installation groove becomes narrower toward a lower portion of the installation groove.

4. The structure of claim 3, wherein the inclined portion is disposed at a side adjacent to the inner belt joint in the installation groove.

5. A structure comprising:
an inner panel disposed inside a door, the inner panel comprising an installation groove; and
an inner belt arranged on an upper end of the inner panel,
wherein a first side of the inner belt is arranged in the installation groove,
wherein the inner belt comprises:
an inner belt joint in contact with a frame of the door, and
a stopper protruding from a surface of the inner belt toward the inner panel, wherein the stopper is inserted into the installation groove,
wherein the inner belt further comprises a rear lip protruding from the surface of the inner belt in a length direction of the inner belt and in contact with an inner surface of the inner panel,
wherein the inner belt further comprises a fixing portion fitted onto and fixed to the upper end of the inner panel and in contact with an outer surface of the inner panel,
wherein a lower end of the fixing portion is located higher than the rear lip,
wherein the lower end of the fixing portion is spaced apart from the inner panel, and
wherein the upper end of the inner panel is a single layer.

6. The structure of claim 5, wherein the stopper is disposed at a position spaced apart from the inner belt joint in a direction opposite to a center pillar of a vehicle.

7. The structure of claim 5, wherein a second side surface of the installation groove becomes a support for supporting the stopper, wherein the second side surface is in contact with the stopper to prevent the inner belt from being pushed.

8. The structure of claim 5, wherein the rear lip is positioned in a lower portion of the stopper.

9. The structure of claim 5, wherein the rear lip is in contact with a bottom surface of the stopper.

10. The structure of claim 5, wherein the stopper and the inner belt joint each comprise thermoplastic vulcanizates (TPV).

11. The structure of claim 10, wherein the stopper comprises a material having a hardness that is greater than a hardness of the inner belt joint.

12. The structure of claim 5, wherein:
the inner belt is extrusion-formed; and
the inner belt joint and the stopper are injection-molded.

13. A vehicle comprising:
a vehicle body comprising a center pillar;
a vehicle door coupled to the vehicle body and comprising a door frame;
an inner panel disposed inside the vehicle door, the inner panel comprising an installation groove; and
an inner belt arranged on an upper end of the inner panel,
wherein a first side of the inner belt is arranged in the installation groove,
wherein the inner belt comprises:
an inner belt joint in contact with the door frame, and
a stopper protruding from a surface of the inner belt toward the inner panel, wherein the stopper is inserted into the installation groove,
wherein the inner belt further comprises a rear lip protruding from the surface of the inner belt in a length direction of the inner belt and in contact with an inner surface of the inner panel, wherein the inner belt further comprises a fixing portion fitted into and fixed to the upper end of the inner panel and in contact with an outer surface of the inner panel, wherein a lower end of the fixing portion is located higher than the rear lip, wherein the lower end of the fixing portion is spaced apart from the inner panel, wherein the upper end of the inner panel is a single layer.

14. The vehicle of claim 13, wherein the stopper is disposed at a position spaced apart from the inner belt joint in a direction opposite to the center pillar of the vehicle body.

15. The vehicle of claim 13, wherein a second side surface of the installation groove becomes a support for supporting the stopper, and wherein the second side surface is in contact with the stopper to prevent the inner belt from being pushed.

16. The vehicle of claim 13, wherein the rear lip is positioned in a lower portion of the stopper.

17. The vehicle of claim 13, wherein the rear lip is in contact with a bottom surface of the stopper.

18. The vehicle of claim 13, wherein the stopper and the inner belt joint each comprise thermoplastic vulcanizates (TPV).

\* \* \* \* \*